United States Patent [19]

Camp

[11] Patent Number: 4,938,523
[45] Date of Patent: Jul. 3, 1990

[54] CONTRACTABLE TENT SHELL TRUCK COVER

[76] Inventor: Michael B. Camp, 424 Jane St., Bakersfield, Calif. 93306

[21] Appl. No.: 346,591

[22] Filed: May 2, 1989

[51] Int. Cl.$^5$ ............................................. B60P 3/34
[52] U.S. Cl. .................................. 296/159; 296/165; 296/105
[58] Field of Search ............. 296/105, 156, 159, 161, 296/165, 167, 100; 135/88, DIG. 5

[56] References Cited

U.S. PATENT DOCUMENTS

| | | | |
|---|---|---|---|
| 2,469,958 | 5/1949 | Fowler | 296/105 |
| 3,606,448 | 9/1971 | Walker | 296/105 |
| 3,874,721 | 4/1975 | Tuggle | 296/105 |
| 4,263,925 | 4/1981 | Arganbright | 135/88 X |
| 4,709,956 | 12/1987 | Bowman | 296/100 |
| 4,721,336 | 1/1988 | Jones | 296/105 X |

FOREIGN PATENT DOCUMENTS 2105660 3/1983 United Kingdom ................ 296/163

Primary Examiner—Dennis H. Pedder
Attorney, Agent, or Firm—Leon Gilden

[57] ABSTRACT

A contractible truck cover is set forth slidably secured within spaced parallel rails secured interiorly of a truck bed. The truck cover is contractible in an accordion style fashion to compress against the forwardmost wall of the truck bed. Spaced first and second links secure "U" shaped rails wherein third and fourth links are secured between the rails at the apex of each downwardly oriented "U" shaped rail to provide rigidity to a skeleton framework securing thereto a flexible canopy. The canopy and framework is removably attached to the spaced rails and a floor panel is securable to lowermost edges of the canopy by a zipper connection including a second door panel replaceable for a first door panel to provide a tent structure when the cover is removed from the truck bed.

9 Claims, 5 Drawing Sheets

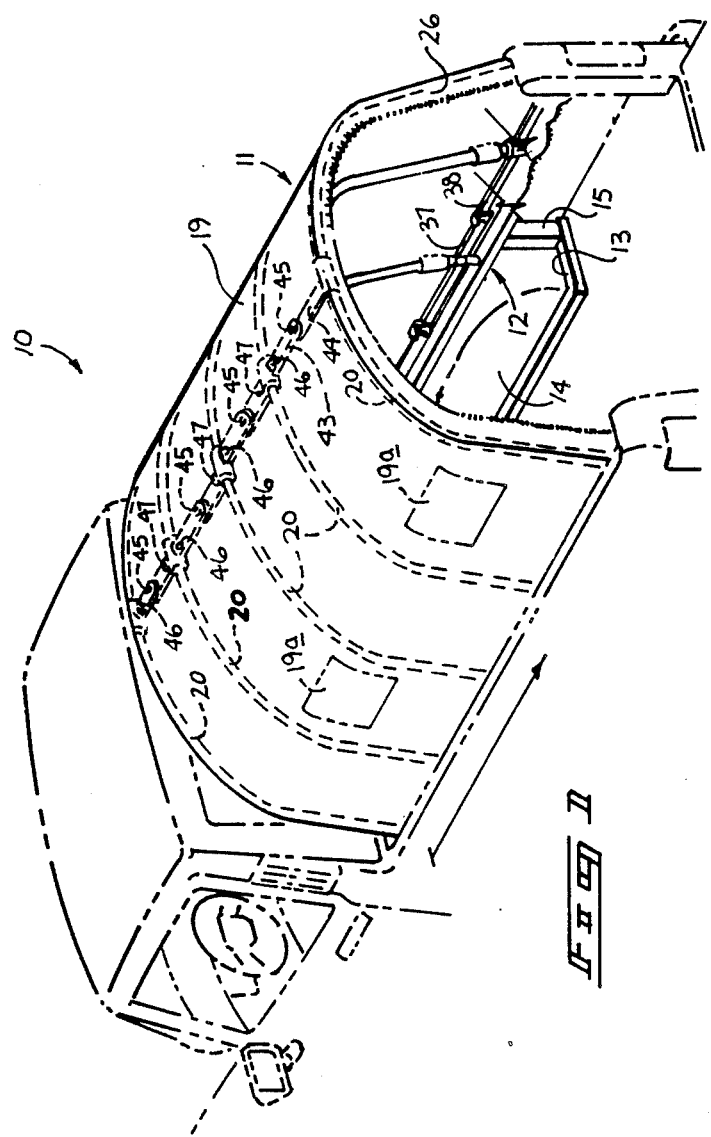

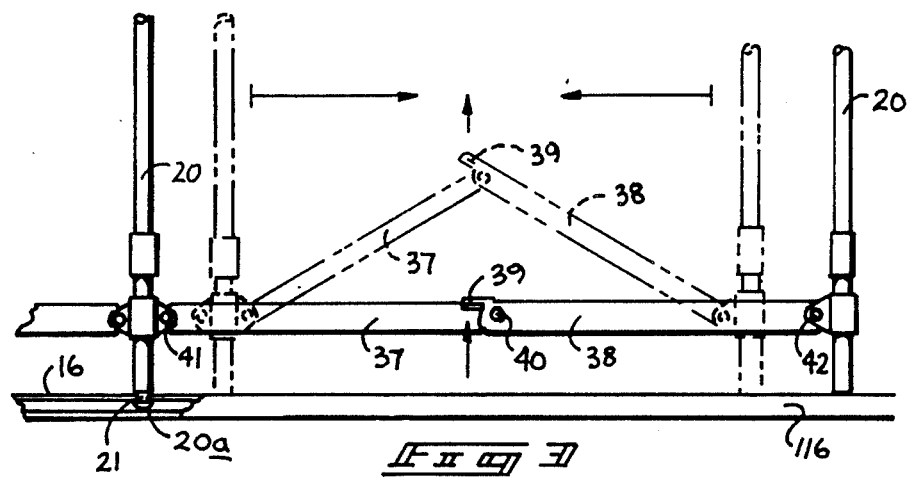
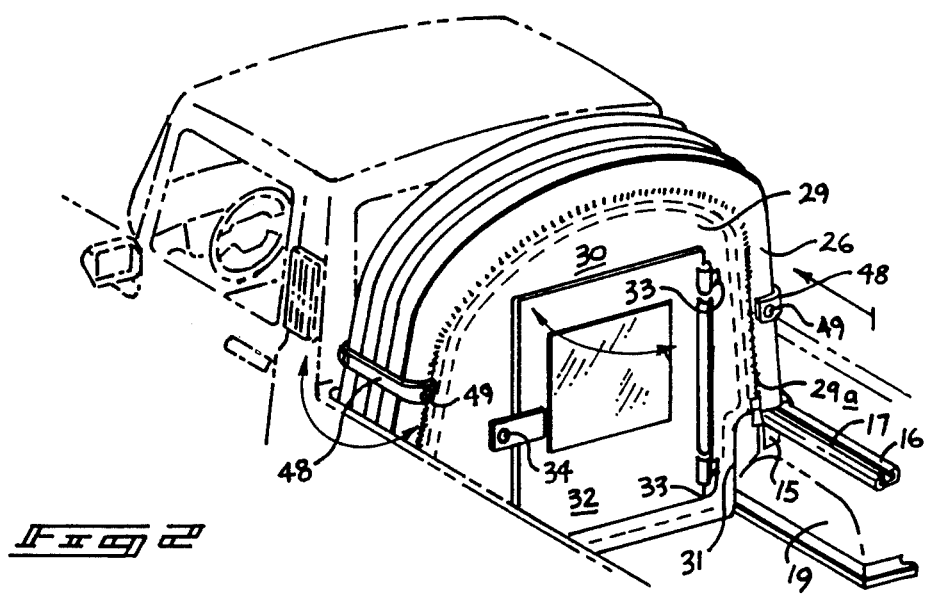

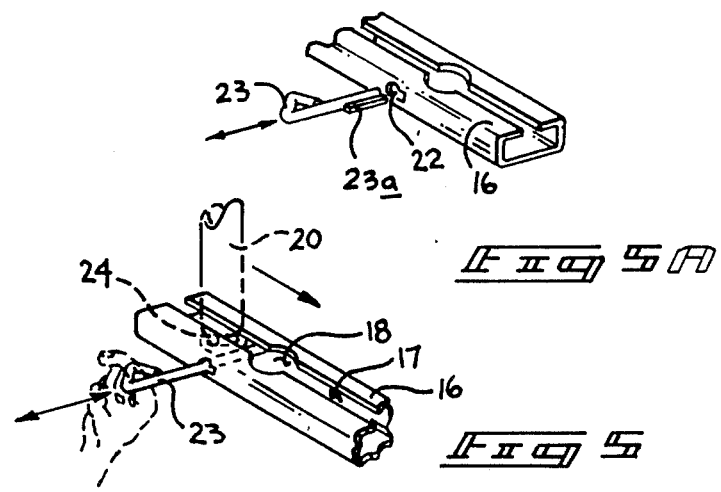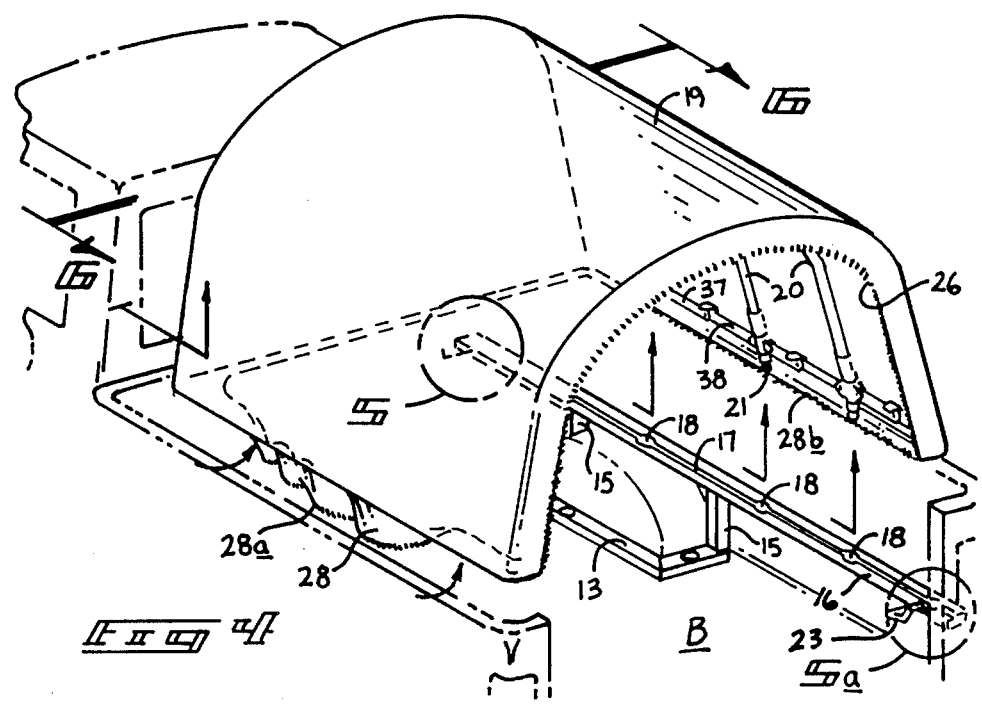

CONTRACTABLE TENT SHELL TRUCK COVER

BACKGROUND OF THE INVENTION

1. Field of the Invention

The field of invention relates to truck covers, and more particularly pertains to a contractible tent shell truck cover wherein the same is collapsibly stored within a truck bed until utilized in extended orientation relative to the truck bed and is further removable from the truck bed and utilized as a tent organization.

2. Description of the Prior Art

The use of truck covers of various types is well known in the prior art. Heretofore the truck cover organizations have been limited in combination with a truck bed alone and have heretofore failed to provide the versatility and strength of construction of the instant invention. For example, U.S. Pat. No. 3,606,448 to Walker sets forth an essentially polygonally configured truck bed cover that is collapsibly organized to be secured forwardly of the truck bed but fails to provide the adaptability of construction and strength of organization of the skeleton framework of the instant invention.

U.S. Pat. No. 8,874,72I to Tuggle sets forth a truck bed covering utilizing spaced, scissor frameworks between "U" shaped frame members to enable an accordion collapsing of the organization wherein the scissor-like side framework fails to provide the rigidity of the overlying framework linkage organization of the instant invention, and wherein the patent further fails to provide the versatility of the cover as a tent when removed from the truck bed.

U.S. Pat. No. 4,285,539 to Cole sets forth a tonneau top for use with truck beds wherein the top is slidably mounted to spaced rails, but as in the other prior art organizations, fails to provide the multi-link organization of the instant invention and further fails to provide the removable organization of the instant invention.

U.S. Pat. No. 4,289,846 to Bourgeois sets forth a collapsible, extensible protective cover mechanism for use within a truck that is collapsible into a compressed organization forwardly of the truck bed, but as in the other patents, sets forth an organization that is permanently mounted to the truck body, as opposed to the instant invention.

U.S. Pat. No. 4,721,336 to Jones sets forth a truck cap organization utilizing a plurality of rails secured to upper edges of the truck bed, and utilizes spaced links for properly spacing "U" shaped frameworks relative to one another wherein the "U" shaped frameworks are of a polygonal organization, as opposed to the arcuate "U" shaped frame members of the instant invention, and further include paired links at apex positions of the "U" shaped frame members.

As such, it may be appreciated that there is a continuing need for a new and improved contractible tent shell truck cover as set forth by the instant invention which addresses both the problems of convenience and effectiveness in organization and in this respect, the present invention substantially fulfills this need.

SUMMARY OF THE INVENTION

In view of the foregoing disadvantages inherent in the known types of tent shell organizations now present in the prior art, the present invention provides a contractible tent shell truck cover wherein the same is selectively securable interiorly of an open style pickup truck bed and removable therefrom with replaceable panels for utilization as a tent organization removed from the truck chassis. As such, the general purpose of the present invention, which will be described subsequently in greater detail, is to provide a new and improved contractible tent shell truck cover which has all the advantages of the prior art truck cover apparatus and none of the disadvantages.

To attain this, the present invention includes a plurality of spaced and slotted truck rails provided with circular openings bisected by the slot for receiving "U" shaped rails. The slotted box rails are secured interiorly of a truck bed utilizing support framework structure. The "U" shaped rails are telescopingly receivable along the slotted box rails wherein the end "U" shaped rails are provided with through-extending apertures for receiving locking pins positionable through the sides of the box rails at opposed terminal ends thereof. First and second links are provided spaced adjacent the box rails for latching the "U" shaped rails in a first extended position and collapsing the first and second links to enable collapsing of the "U" shaped rails. Third and fourth links are provided and formed pivotally at the apex of curvature of the "U" shaped rails to stabilize the rails relative to one another. Removable end panels are provided on a canopy structure that are zippered and replaceable to provide a first panel of complementary configuration to the end of a canopy structure and extending downwardly to include tapered sides to be directed into the truck bed to provide an enclosed canopy. A second panel is replaceable of a configuration substantially equal to that of the cross-sectional area of the canopy and further including a replaceable zippered door for providing an enclosed tent organization upon removing the canopy and "U" shaped rails from the box rails.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and sYstems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved contractible tent shell truck cover which has all the advantages of the prior art tent cover organizations and none of the disadvantages.

It is another object of the present invention to provide a new and improved contractible tent shell truck cover which may be easily and efficiently manufactured and marketed.

It is a further object of the present invention to provide a new and improved contractible tent shell truck cover which is of a durable and reliable construction.

An even further object of the present invention is to provide a new and improved contractible tent shell truck cover which is susceptible of a low cost of manufacture with regard to both materials and labor, and which accordingly is then susceptible of low prices of sale to the consuming public, thereby making such contractible tent shell truck covers economically available to the buying public.

Still yet another object of the present invention is to provide a new and improved contractible tent shell truck cover which provides in the apparatuses and methods of the prior art some of the advantages thereof, while simultaneously overcoming some of the disadvantages normally associated therewith.

Still another object of the present invention is to provide a new and improved contractible tent shell truck cover wherein the same is selectively utilized as a truck cover and removable from a truck body to be utilized as a tent.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an isometric illustration of the instant invention in a collapsed orientation relative to a truck body.

FIG. 3 is an orthographic view taken in elevation and partially in section of the first and second links associated with the "U" shaped rails and their relationship to the slotted box rail.

FIG. 4 is an isometric illustration of the instant invention illustrating the cover member removed from the truck bed framework.

FIG. 5 is an isometric illustration, somewhat in section, of the locking mechanism for securement of the "U" shaped rails to the slotted box members.

FIG. 5a is an orthographic view taken partially in section of the lock pin organization.

DESCRIPTION OF THE PREFERRED EMBODIMENT

Figure 6:
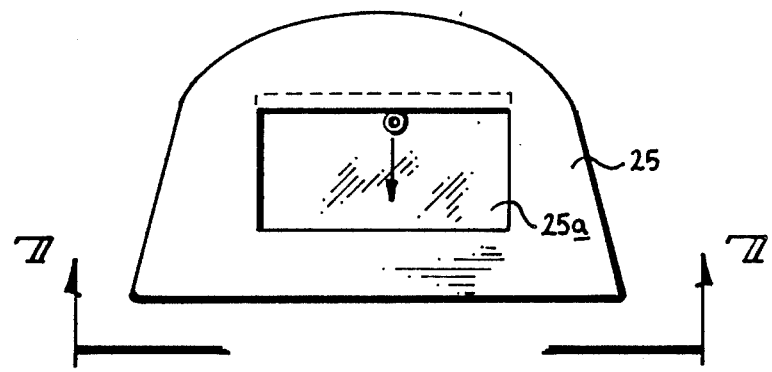
FIG. 6 is an orthographic view taken along the lines 6—6 of FIG. 4 in the direction indicated by the arrows.
Figure 7:
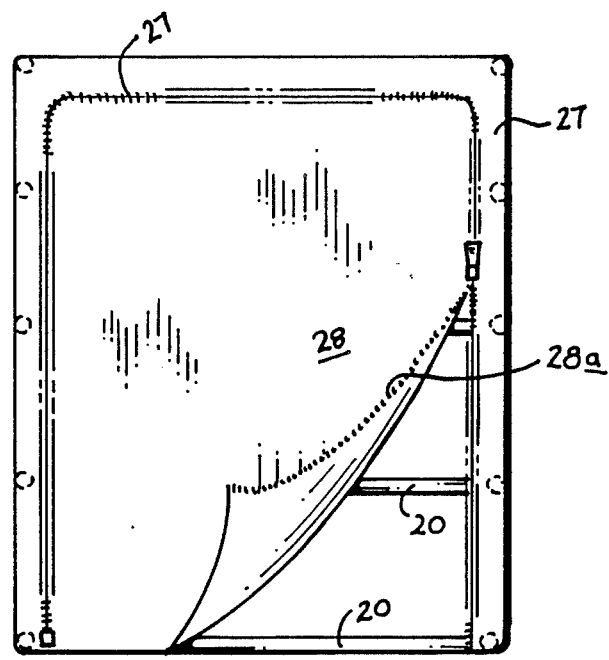
FIG. 7 is an orthographic view taken along the lines 7—7 of FIG. 6 in the direction indicated by the arrows.
Figure 9:
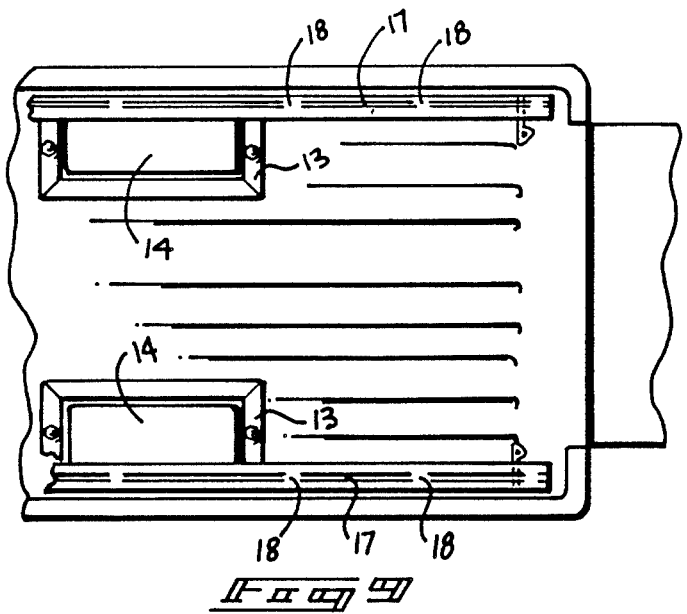
FIG. 9 is an orthographic plan view of the truck bed and associated framework for securement of the cover member thereto.

With reference now to the drawings, and in particular to FIGS. 1 to 9 thereof, a new and improved contractible tent shell truck cover embodying the principles and concepts of the present invention and generally designated by the reference numeral 10 will be described.

More specifically, the contractible tent shell truck cover apparatus 10 essentially comprises, a cover member 11 releasably securable to a truck bed framework 12 that is integrally secured interiorly of an elongate truck bed "B" that includes conventional sides, a tailgate, and interiorly directed wheel wells 14. Formed about the spaced wheel wells 14 are "U" shaped frame portions 13 with vertical legs 15 directed upwardly and orthogonally relative to terminal ends of the legs of the "U" shaped frame portion 13 wherein the vertical legs 15 support a slotted box rail 16. It is understood that each side of the interior of the truck bed "B" is a mirror image of the other wherein for purposes of illustration, reference to FIGS. 1 to 5 and 9 illustrate the orientation and configuration of the truck bed framework 12.

The slotted box rails 16 are coextensively secured interiorly of each vertical wall of the truck bed "B" and include an overlying elongate slot 17 (defining a slotted track) formed with spaced circular openings 18 that include the elongate slot 17 formed diametrically therethrough. An upwardly depending arcuate canopy 19 is secured over a collapsing skeleton framework, to be described in more detail below, wherein the canopy 19 is formed of a flexible fabric or polymeric material overlying and enclosing the canopy framework to be described. The canopy framework includes a series of spaced parallel "U" shaped rails 20 of arcuate configuration with the legs directed downwardly with lower terminal ends 20a of each leg receivable within a respective opening 18 through each box rail 16. Formed adjacent the lower terminal ends 20a of the "U" shaped rails 20 are arcuate slots 21, or arcuate grooves, to enable the "U" shaped rails 20 to be slidably reciprocated within the elongate slots 17, as illustrated per FIGS. 2, 3, and 5.

Formed through the side walls of each end of each box rail 16 is a through-extending aperture 22 formed through each side wall of the box rail 16 to receive an elongate lock pin 23 that extends through the side walls proximate each remote end of each box rail (utilizing two lock pins 23 and two through-extending apertures 22 for each box rail 16) wherein each through-extending aperture 22 is formed as a key opening (see FIG. 5a) to receive a lock pin stud 23a formed adjacent the handle of each lock pin 28 to be received through the associated key opening 22. Directing of the lock pin 23 through the associated key opening 22 and through an associated bore formed through the "U" shaped rail 20 through the arcuate slot portion 21 to receive the lock pin 23 therefore, will lock the associated outermost rail 20 to the box rail 16. It is therefore to be understood that at least each end of "U" shaped rail 20 is to be provided with the bore 24, but for purposes of manufacturing and ease of production, each "U" shaped rail 20 may include a bore 24 through the arcuate slot portion 21.

Figure 8:
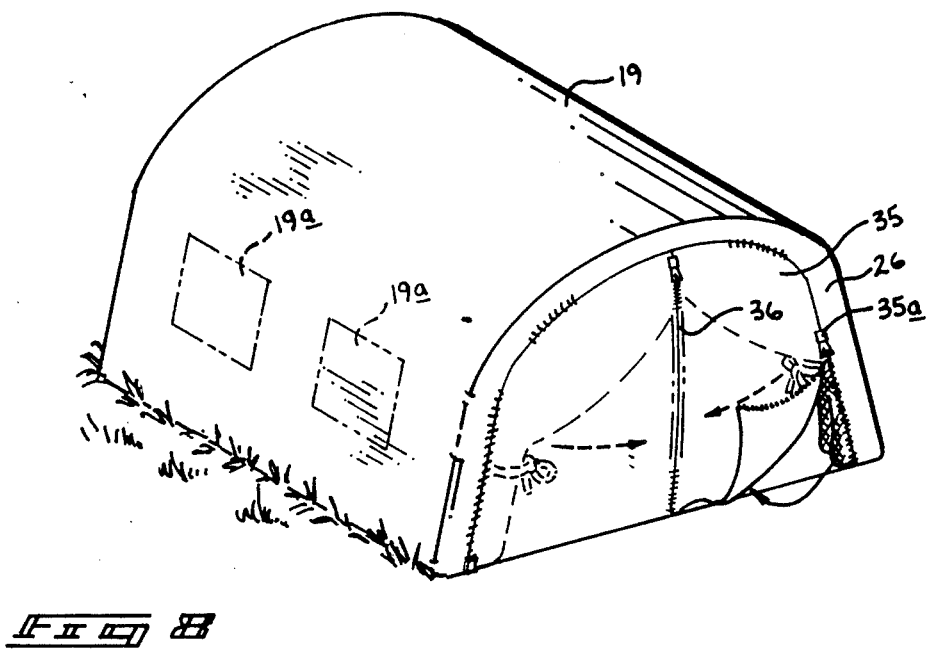
FIG. 8 is an isometric illustration of the instant invention utilized as a tent.

The canopy 19 includes a forward end 25 containing a window 25a which may be provided with a conventional shade reciprocatably mounted within the forward end wherein the canopy 19 itself may include a series of windows, as illustrated in phantom as 19a in FIG. 1. The forward end 25 is of an arcuate configuration and integrally formed to the canopy 19 adjacent the rear window of the associated truck to provide visibility through the interior of the canopy 19 form within the truck cab. The canopy 19 further includes a zippered rearward end 26 containing a continuous zippered periphery and further including a zippered bottom surface 27 defined as an inwardly directed flange relative to the sides of the canopy 19. The zippered bottom surface is thereby formed to receive a removable bottom insert 28 formed with a bottom zippered 28a releasably securable to the bottom surface 27 of the canopy 19. A first door panel 29 includes a first door zipper 29a securable to a zippered perimeter of the canopy, as illustrated in FIG. 2. The first door panel 29 includes an arcuate upper surface 80 of equal configuration to the forward end 25 and includes a narrowed bottom 31 of equal area to that defined between the canopy and truck bed floor, as illustrated in FIG. 2, and of a width substantially equal to that of the distance between the wheel wells 14 to enable retraction of the cover member 11, as illustrated in FIG. 2. The first door panel 29 includes a hinge door 32 with hinges, including snap fasteners 33, to secure the hinges of the door to the first door panel 29 with a second snap fastener 34 at the other side of the door to secure the door to the zippered rearward end 26. A second door panel 35, of a configuration equal to the forward end 25, includes a zipper perimeter 35a securable to the zippered rearward end 26, as illustrated in FIG. 8. Upon removal of the cover member 11 by disengaging the lock pins 23, as illustrated in FIG. 5 for example, the cover member 11 is removable to accept the second door panel 35 as well as the insert 28 to provide an enclosed tent organization, as illustrated in FIG. 8. A door zipper 36 medially positioned of the second door panel 35 divides the second door panel 35 equally to enable a convenient entrance relative to the interior of the canopy 19 when utilized as a tent.

Reference to FIG. 3 illustrates the side link organizations, as illustrated in FIG. 1 for example, employing a first link 37 and a second link 38. The second link 38 includes a second link nose 29 directed and extending coextensively of an upper edge of the second link 38 to overlie and align the first link 37 relative to the second link 38 when the first and second links are in an aligned orientation, as illustrated in FIG. 3. The first link 37 includes a first link pivot 41 positioned adjacent its rearward end and a "U" shaped rail 20 with the second link 38 including a second link pivot 42 to enable pivoting of the second link 38 relative to its associated "U" shaped rail 20. The first and second links 37 and 38 respectively include a common first medial link pivot 40 to pivotally join the first and second links at their forward ends relative to one another. A first and second link are pivotally mounted between each of the "U" shaped rails 20 to enable collapsing and extension of the rails, as desired, from a first extended position to a second retracted position, as illustrated relatively in FIGS. 1 and 2. To provide integrity and structural strength to the canopy to accommodate loads and maintain alignment of the various "U" shaped rails, a third and fourth link 43 and 44 respectively are pivotally mounted at the medial uppermost portion of the "U" shaped rails 20, wherein the third and fourth links are pivotally mounted between each of the "U" shaped rails medially of the first and second links 37 and 38, which are in themselves positioned adjacent the respective box rails 16 at either side of the truck bed "B". A second medially link pivot 45 pivotally joins each third and fourth link 43 and 44 together with a third link pivot 46 formed at the rearwardmost end of the third link 43 and a fourth link pivot 47 formed at the rearwardmost end of the fourth link 44 to pivotally mount the respective third and fourth links to the adjoining "U" shaped rails 20, as illustrated in FIG. 1 for example.

In a collapsed or second position, as illustrated in FIG. 2, a closure strap 48 of flexible construction and of a length substantially equal to that of the sum of the diameters of the rails 20 and the captured canopy therebetween includes a forwardly mounted closure strap fastener 49 formed onto the zippered rearward end 26 to secure the cover member 11 in a contracted or collapsed position, as illustrated in FIG. 2.

It should be understood therefore from the above description that the instant invention may be utilized effectively as a truck canopy and readily removable from the truck bed framework 12 to be utilized as a tent organization, as illustrated in FIG. 8. Accordingly it is believed that the manner of usage and operation of the instant invention is apparent from the above description and accordingly, no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A contractible tent shell truck cover apparatus in combination with an elongate truck bed comprising,
   a truck bed framework mounted within said truck bed;
   said framework including spaced parallel rails each including an upwardly directed slotted track receiving said cover member wherein said cover member includes a series of spaced and inverted "U" shaped rails including downwardly directed legs, each of said legs including a terminal end receivable within one of said rails, and each terminal end of each of said legs defined by a predetermined cross-sectional configuration, and
   plural link means pivotally mounted to and between spaced "U" shaped rails for enabling the cover member to contracted from a first extended position coextensive with said truck bed to a second retracted and collapsed position,
   and
   a flexible canopy overlying each of said "U" shaped rails and formed with a forward end, and a rearward end formed as an inwardly directed arcuate flange about a rearwardmost "U" shaped rail, and wherein each "U" shaped rail includes an annular groove formed adjacent each terminal end wherein said annular groove is slidably received within said track, and wherein each track of each rail includes a series of spaced circular openings of a configuration complementary to the predetermined cross-sectional configuration of each terminal end to receive a respective terminal end therethrough.

2. A contractible tent shell truck cover as set forth in claim 1, said "U" shaped rails each include a lock pin mounted through a side wall of one of said parallel rails.

3. A contractible tent shell truck cover as set forth in claim 2 wherein said lock pin includes a lock pin stud directed outwardly of said lock pin receivable within a key-shaped opening formed in one of said parallel rails.

4. A contractible tent shell truck cover as set forth in claim 3 wherein said plural link means includes a first, second, and third series of aligned collapsing link members.

5. A contractible tent shell truck cover as set forth in claim 4 wherein said first and third series of link members each includes a first link and a second link each pivotally mounted to and between spaced "U" shaped rails, and wherein said first and second links are pivotally mounted to one another, and said second link includes a nose aligned with said second link and extending overlying said first link to maintain said first link in alignment with said second link when said first and second links are in an extended orientation relative to one another.

6. A contractible tent shell truck cover as set forth in claim 5 wherein said second series of link members includes a series of third and fourth links pivotally mounted between spaced "U" shaped rails, said third and fourth links pivotally mounted to said "U" rails medially of said "U" shaped rails and medially of said first and second series of link members at arcuate uppermost portions of each "U" shaped rail.

7. A contractible tent shell truck cover as set forth in claim 6 wherein said cover member further includes a zippered bottom surface selectively receiving an insert, said insert including a zipper member to secure said insert to said zippered bottom surface.

8. A contractible tent shell truck cover as set forth in claim 7 wherein said cover member includes a first door including a zippered door periphery securable to said rearward end.

9. A contractible tent shell truck cover as set forth in claim 8 wherein said cover member further includes a further zippered peripheral surface securable to said rearward end and including a still further zipper medially formed of said further door to divide said further door into two separate equal portions.

* * * * *